United States Patent
Yoon et al.

(10) Patent No.: US 10,083,165 B2
(45) Date of Patent: Sep. 25, 2018

(54) METHOD OF CONTROLLING DATA DISPLAY DEVICE

(71) Applicant: LSIS CO., LTD., Gyeonggi-do (KR)

(72) Inventors: Yeo-Chang Yoon, Gyeonggi-do (KR); Myung-Hwan Lee, Gyeonggi-do (KR); Seok-Chan Lee, Gyeonggi-do (KR); Seung-Ju Lee, Gyeonggi-do (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 15/365,213

(22) Filed: Nov. 30, 2016

(65) Prior Publication Data

US 2017/0255607 A1    Sep. 7, 2017

(30) Foreign Application Priority Data

Mar. 7, 2016    (KR) .................. 10-2016-0027316

(51) Int. Cl.
*G06F 17/24*    (2006.01)
*G06F 3/0484*    (2013.01)
*G06F 17/30*    (2006.01)

(52) U.S. Cl.
CPC .......... *G06F 17/245* (2013.01); *G06F 3/0484* (2013.01); *G06F 17/247* (2013.01); *G06F 17/30365* (2013.01); *G06F 17/30383* (2013.01); *G06F 17/30893* (2013.01)

(58) Field of Classification Search
CPC .................................................. G06F 17/245
USPC ....................................................... 715/217
See application file for complete search history.

(56) References Cited

U.S. PATENT DOCUMENTS

| | | | |
|---|---|---|---|
| 6,850,808 B2 | 2/2005 | Yuen et al. | |
| 7,143,339 B2 | 11/2006 | Weinberg et al. | |
| 2002/0169799 A1* | 11/2002 | Voshell | G06F 17/246 |
| | | | 715/212 |
| 2012/0278015 A1 | 11/2012 | Budhraja et al. | |
| 2015/0100170 A1 | 4/2015 | Raymond | |
| 2015/0161193 A1* | 6/2015 | Damodar | G06F 17/30371 |
| | | | 707/694 |
| 2015/0213211 A1* | 7/2015 | Zaleski | G06F 19/3406 |
| | | | 715/753 |
| 2016/0034158 A1* | 2/2016 | Livesay | G05B 19/41835 |
| | | | 715/736 |

FOREIGN PATENT DOCUMENTS

| | | |
|---|---|---|
| EP | 2980608 A1 | 2/2016 |
| JP | 2002-502072 A | 1/2002 |

(Continued)

OTHER PUBLICATIONS

European Search Report dated Apr. 21, 2017 issued in corresponding European Application No. 16196324.4.

(Continued)

*Primary Examiner* — Frank D Mills
(74) *Attorney, Agent, or Firm* — K&L Gates LLP

(57) ABSTRACT

Disclosed herein is a method of controlling data display device. The method includes: loading a monitoring view to initialize it; determining whether to display a tabular view; setting a tabular module if it is determined that the tabular view is to be displayed; displaying the tabular view according to set conditions; and checking whether to perform a view update mode during the displaying the tabular view.

4 Claims, 6 Drawing Sheets

(56) References Cited

FOREIGN PATENT DOCUMENTS

| | | | |
|---|---|---|---|
| KR | 10-0676994 | B1 | 1/2007 |
| KR | 10-2013-0127216 | A | 11/2013 |
| KR | 10-1553769 | B1 | 9/2015 |
| KR | 10-2015-0109660 | A | 10/2015 |
| WO | 2010/085468 | A2 | 7/2010 |

OTHER PUBLICATIONS

OSI Advanced Tabulars Overview, Ver. 1.2, 2010-2012.
Nunzion Marco Torrisi, Monitoring Services for Industrial Applications, IEEE Industrial Electronics Magazine, pp. 49-60, 2011.

* cited by examiner

PRIOR ART

METHOD OF CONTROLLING DATA DISPLAY DEVICE

CROSS REFERENCE TO RELATED APPLICATION

This application claims the benefit of Korean Patent Application No. 10-2016-0027316, filed on Mar. 7, 2016, entitled "CONTROLLING METHOD OF DATA DISPLAY APPARATUS", which is hereby incorporated by reference in its entirety into this application.

BACKGROUND

1. Technical Field

The present disclosure relates to a method of controlling a data display device, and more particularly, to a method of controlling a data display device capable of providing automatic update mode.

2. Description of the Related Art

A remote monitoring control system (hereinafter referred to as a supervisory control and data acquisition or SCADA) is an industrial control system, and may use analog or digital signals to acquire, receive, log or display state information or data on a remote apparatus with a remote terminal unit.

FIG. 1 is a diagram conceptually illustrating a function of display actual data in a typical SCADA system.

Specifically, when data is provided to a real-time database 10 from a server, data necessary for a monitoring view is engineered via an editor 20. Then, when processed information is provided to a viewport 30, the screen can be monitored in real-time in the viewport 30.

The editor 20 is a graphic editor and may process objects or data so that they are presented according to a change in the number of the data in the database. As used herein, engineering is a generic term for calculating and processing data appropriately.

The viewport 30 may be a kind of display device and may display a typical view as well as a tabular view.

In particular, the tabular view is provided to reduce simply repeated tasks, by way of configuring data stored in the database as a template desired by a user to display associated data in the form of a table.

FIG. 2 is view graphically showing the relationship between the typical editor 20 and the viewport 30 displayed in a tabular format.

Referring to FIG. 2, data is engineered in the editor 20 to configure objects in hierarchical structure. The structure includes separate layers, i.e., an upper layer and a lower layer. For example, data may be processed such that an object is configured as GenType in the upper layer Layer0, and an object is configured as Station in the lower layer Layer1.

It can be seen from FIG. 2 that when the editor 20 provides the processed data to the viewport 30, data necessary for the respective layers, Layer0 and Layer1, may be displayed and expanded.

Referring to the viewport 30, hydroelectric power and thermal electric power may be set to the upper layers Layer0, respectively. In Layer1 that is a lower layer belonging to Layer0 meaning a hydroelectric power plant, a Daechung power plant may be included, for example. In Layer1 that is a lower layer belonging to Layer0 meaning a thermal electric power plant, a Pyungtaek power plant may be included, for example.

In this manner, when the editor 20 provides the engineered data, the viewport 30 may configure the view as desired to display it. Accordingly, the industrial system can be monitored and controlled.

However, the viewport 30 cannot recognize a change in the database in real-time and thus cannot reflect such change during the operation of the system.

As a result, the old view is continuously displayed even after the database is changed, such that the operator may not be able to cope with such change quickly.

SUMMARY

It is an object of the present disclosure to provide a method of controlling a data display device that can reflect a change in data by periodically checking if there is a change in a database, which was unable to be reflected in real-time in a tabular view mode.

It is another object of the present disclosure to provide a method of controlling a data display device that can update a view by implementing a tabular automatic update function to check if there is a change in a database and automatically reflecting it.

It is yet another object of the present disclosure to provide a method of controlling a data display device that can improve the safety of the system operation by periodically checking and automatically updating, independently of the operator's awareness.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a method includes: loading a monitoring view to initialize it; determining whether to display a tabular view; setting a tabular module if it is determined that the tabular view is to be displayed; displaying the tabular view according to set conditions; and checking whether to perform a view update mode during the displaying the tabular view.

The checking may include checking if there is a change in a number of tabular object data items in a tabular database.

The method may include: if it is determined that there is a change in the number of the tabular object data items, entering the view update mode via a multi-thread task, and loading the monitoring view to initialize it.

The method may include: if it is determined that there is no change in the number of the tabular object data, checking validity by comparing an existing database map with the tabular database at the time of the checking.

The method may include: if it is determined that the data items are matched, checking again if there is a change in the number of tabular object data; and if it is determined that the data items are not matched, entering the view update mode and loading the monitoring view to initialize it.

The checking the validity may include determining whether properties or associations of the tabular object data items are matched.

The checking whether to perform the view update mode may include checking whether to perform the view update mode periodically at a predetermined interval.

As set forth above, according to an exemplary embodiment of the present disclosure, a change in data can be reflected and displayed by periodically checking if there is a change in a database, which was unable to be reflected in real-time in a tabular view mode.

According to an exemplary embodiment of the present disclosure, a tabular automatic update function is implemented, such that a change in the database is periodically checked and the view can be update by reflecting it.

According to an exemplary embodiment of the present disclosure, the safety of the system operation can be improved by periodically checking and automatically updating, independently of the operator's awareness.

DETAILED DESCRIPTION

Figure 1:
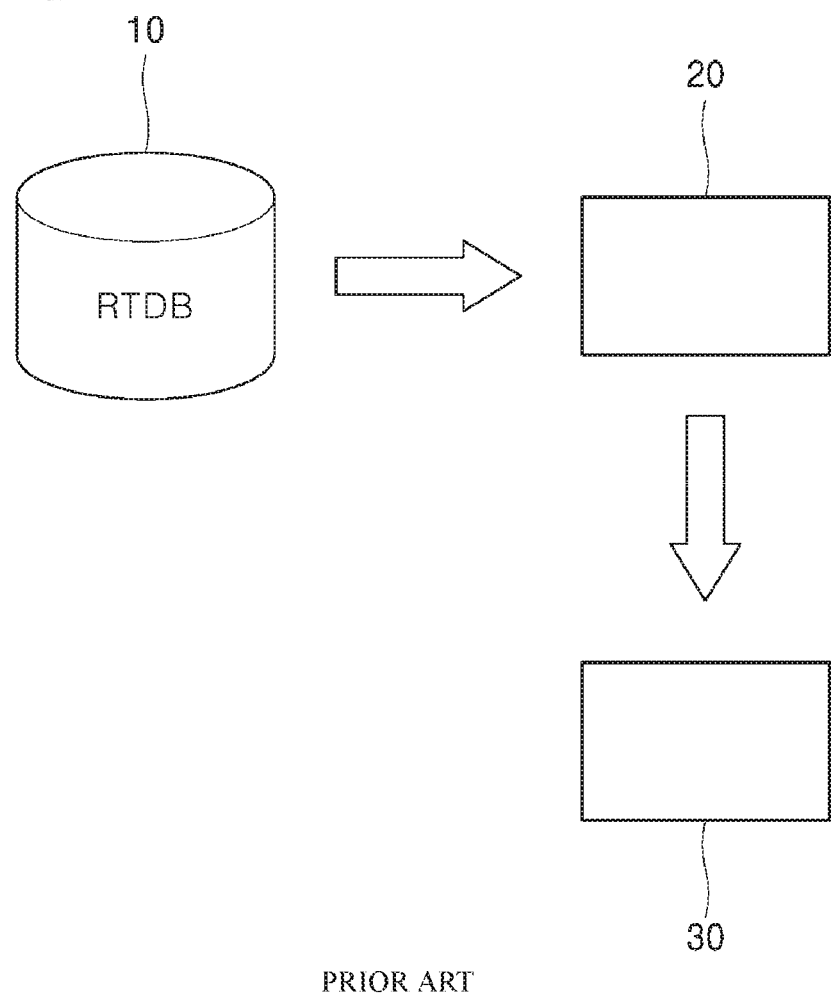
FIG. 1 is a diagram conceptually illustrating a function of display actual data in a typical SCADA system.
Figure 2:
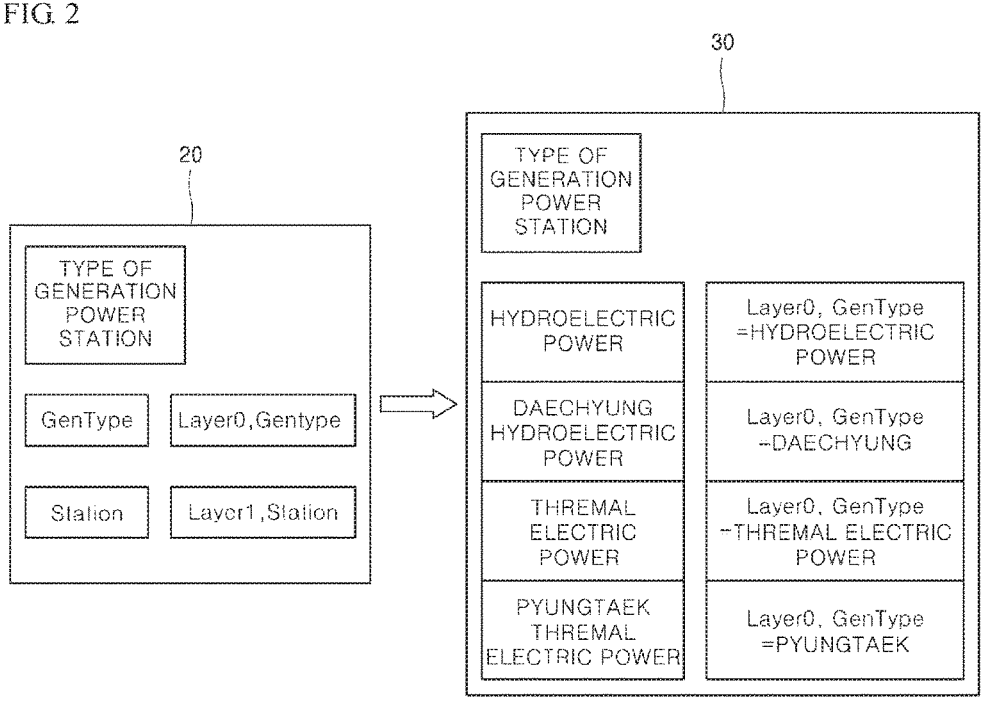
FIG. 2 is view graphically showing the relationship between the typical editor and the viewport displayed in a tabular format.

Detailed descriptions of well-known functions and structures incorporated herein will be omitted to avoid obscuring the subject matter of the present disclosure. Further, terms or words used in the specification and claims shall not be construed merely in a conventional and dictionary definition but shall be construed in a meaning and concept corresponding to the technical idea of the present invention based on the principle that an inventor is allowed to properly define the concepts of terms in order to describe his or her invention in the best way. Therefore, the terms, such as those defined in commonly used dictionaries, should be interpreted as having a meaning that is consistent with their meaning in the context of the relevant art and/or the present application.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow charts.

These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products containing instruction means for performing the functions described in the blocks in the drawings or in the steps in the flow charts.

The computer program instructions may also be installed in computers or other programmable data processing device. Such instructions may create computer-executable processes to perform a sequence of operation steps on computers or other programmable data processing devices. In addition, the instructions may also be installed in computers or other programmable data processing device. Such instructions can provide steps for executing the functions described in the blocks in the drawings or in the steps in the flowchart.

In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two consecutive blocks or steps may be performed substantially simultaneously or may be performed in the reverse order depending on the function to be performed.

Figure 3:
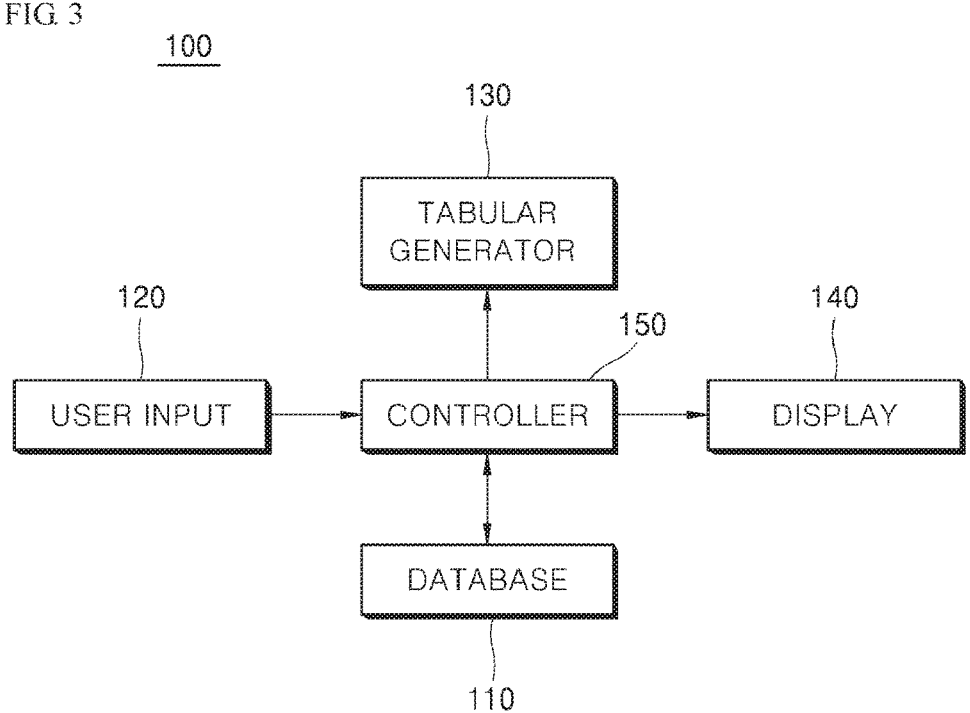
FIG. 3 is a block diagram of a tabular view generating apparatus 100 according to an exemplary embodiment of the present disclosure.

FIG. 3 is a block diagram of a tabular view generating apparatus 100 according to an exemplary embodiment of the present disclosure.

The tabular view generating apparatus 100 according to the exemplary embodiment of the present disclosure may be included in a SCADA control system or in a monitoring system that monitors data acquired from the SCADA system.

According to the exemplary embodiment of the present disclosure, the tabular view generating apparatus 100 may reflect and display a change in data by periodically checking if there is a change in a database, which was unable to be reflected in real-time in a tabular view mode.

Referring to FIG. 3, the tabular view generating apparatus 100 includes a database 110, a user input 120, a tabular view generator 130, a display 140, and a controller 150.

The database 110 stores data received from a data acquisition and management system such as an energy management system or a remote control system. In addition, the database 110 may include a tabular format using data, a tabular generating data in the tabular format, a sorting manner, and paging data. In order to perform real-time control, the data in the database 110 may receive and store changed data from a management system whenever necessary. The database 110 may store the content on the changed data in the form of a file as mapping information.

The user input 120 may input a tabular view control signal on the data received and stored from a data acquisition and management system such as an energy management system or a remote system. For example, various items such as a tabular format or a table or a layer for generating a tabular view may be input via the user input 120.

The tabular view generator 130 generates a tabular view with the data stored in the database 110 according to the items for generating a tabular view input via the user input 120. The tabular view generator 130 may generate a repeating tabular format or a hierarchical tabular format depending on a tabular format input via the user input 120. When the tabular view generator 130 generates a hierarchical tabular format, tables are input via the user input 120 from the highest one to the lowest one sequentially. When the tabular view generator 130 generates a repeating tabular format, data included in an input table may be arranged in rows and columns of the tabular format. The tabular view generator 130 may display a tabular view by setting a time of generating the tabular view, a layout of data in the tabular view or paging index based on a user control signal input via the user input 120.

The display 140 displays the tabular view created by the tabular view generator 130 under the control of the controller 150. The display 140 may display the tabular view in a predetermined format or layout according to the controller 150 and input from the user input 120. In addition, the display 140 may display only data in predetermined columns and rows depending on a set paging value and may hide other data.

The controller 150 includes a graphic editor and may engineer the data received from the database 110. In addition, the controller 150 may detect a tabular view control signal input to the user input 120 and control the tabular view generator 130 so that it generates tabular objects according to the items for generating a tabular view. Then, the tabular objects thus created may be displayed on the display 140.

In particular, according to the exemplary embodiment of the present disclosure, the controller 150 may control a tabular view update mode operation. That is, the controller 150 may check whether to enter the update mode as a multiple-thread task while a tabular view is displayed. Specifically, the controller 150 may periodically check if there is a change in the content of data in the database 110 and may reflect it to the tabular view. By doing so, the controller 150 may check a change in the data periodically while a tabular view is displayed, even if an operator does not intentionally check if there is a change in the data. In addition, if it is checked that there is a change in the data, the controller 150 may enter an automatic update mode to display the content of new data. As described above, by employing the tabular view generating apparatus 100 according to the exemplary embodiment, the operator's burden on management and control can be reduced, and the industrial control system can be managed safely.

In the foregoing description, the tabular view generating apparatus 100 has been described as being included in a SCADA control system or a monitoring system. However, it is to be understood that the tabular view generating apparatus 100 may also be used in an energy managements system (EMS).

A method of controlling the tabular view generating apparatus 100 shown in FIG. 3 will be described in detail below with reference to FIGS. 4 to 6.

Figure 4:
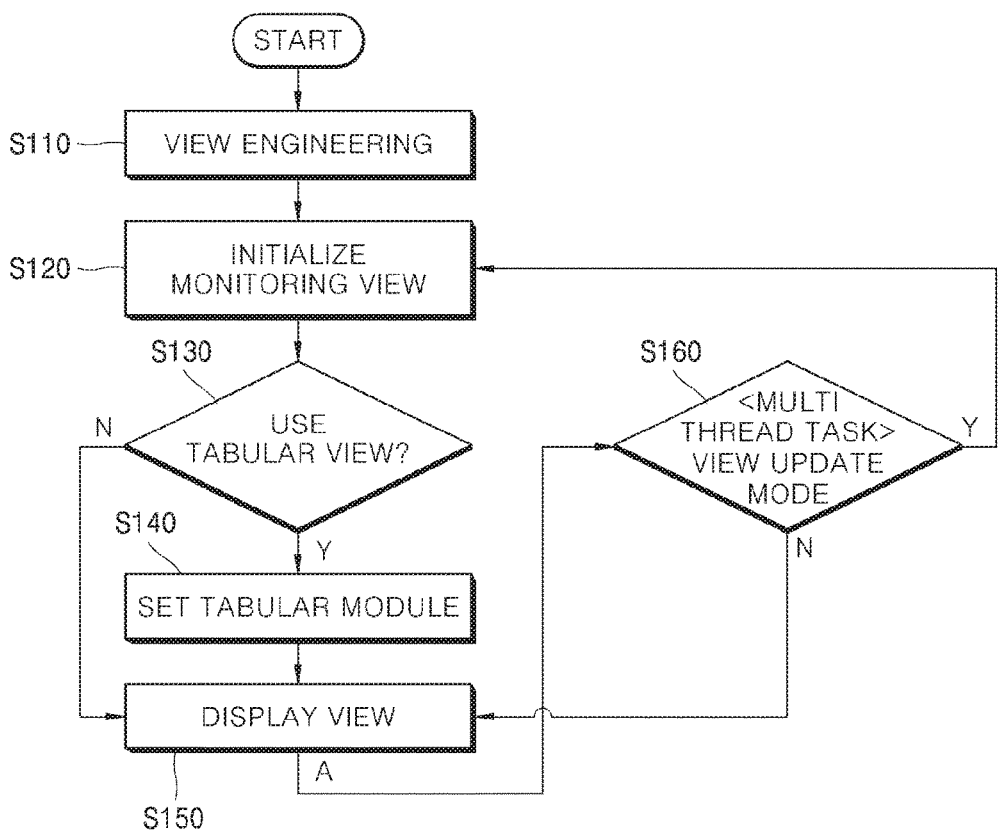
FIG. 4 is a flow chart for illustrating a tabular view update mode operation according to an exemplary embodiment of the present disclosure.

FIG. 4 is a flow chart for illustrating a tabular view update mode operation according to an exemplary embodiment of the present disclosure.

The tabular view update mode operation will be described with reference to FIGS. 3 and 4.

Data necessary for displaying a view is engineered in a graphic editor of the controller 150 (step S110).

The controller 150 receives data from the database and processes graphic objects (a circle, a line, a rectangle, etc.) and data associated with the graphic objects. Further, if there is a change in the data in the database, the controller 150 processes the data by reflecting the change such as a form, a size and the like of the graphic objects. Such change in the form and the size of the data graphic objects results in a change in the object configuration. Accordingly, such information on the form and size of the data objects may be described as properties of the object data. Accordingly, the controller 150 may determine whether the properties of the data are matched when it detects if there is a change in the object configuration.

Subsequently, the controller 150 receives data in the step of engineering, loads a monitoring view, and then initializes the monitoring view (step S120).

The controller 150 determines whether to display the monitoring view as a typical view or a tabular view (step S130).

If the tabular view is selected (Yes in step S130), the tabular view generator 130 perform tabular module setting (step S140).

After the tabular view generator 130 performs the operation of the tabular module setting, the display 140 displays a view in the tabular format (step S150).

If the tabular view is not selected as the monitoring view (No in step S130), a typical view is displayed (step S150).

Subsequently, if the tabular view is selected as indicated by line A, it is checked whether to perform a view update mode as a multi-thread task (step S160). That is, it is checked whether to perform a view update mode as a parallel processing or as a multi-thread task while the current view is displayed.

According to the exemplary embodiment of the present disclosure, when the tabular view is selected as indicated by line A, the view update mode is checked at predetermined intervals. If it is checked that there is a change in data in the database 110 (Yes in step S160), the monitoring view may be initialized so that the content displayed on the tabular view is also changed (step S120). If it is checked that there is no change in data in the database 110 (No in step S160), the current tabular view may remain (step S150).

As a result, in the SCADA system, the current monitoring view can be displayed with the content matched to the database.

Figure 5:
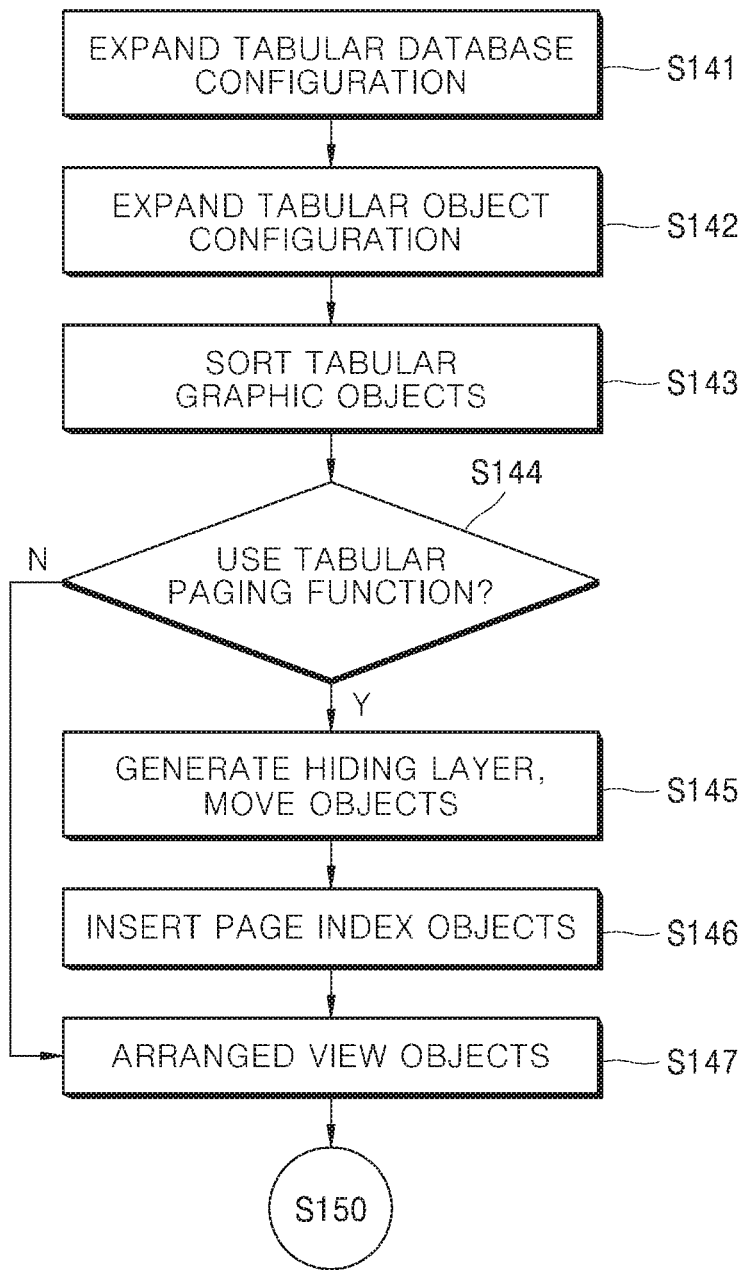
FIG. 5 is a flowchart for illustrating the method illustrated in FIG. 4 in more detail.

FIG. 5 is a flowchart for illustrating the step S140 of the method illustrated in FIG. 4 in more detail.

Referring to FIG. 5, the step S140 is performed by the tabular view generator 130 and initially includes expanding tabular database configuration (step S141).

The tabular configuration expansion function can be implemented by connecting objects engineered in the previous step to points associated therewith to configure the database. As used herein, the expansion means that when a typically database table is set during the engineering, a database is configured with rows of the number equal to the number of the row of the actual table.

After expanding the tabular database configuration, tabular objects are configured based on data associated with graphic objects.

For example, grouping may be carried out each of the layers, and the graphic objects to be displayed may be expanded up to the number of rows existing in the actual table.

Then, the graphic objects in the tabular view are sorted (step S143). As the values indicating the order in which the objects are displayed in the tabular view, texts, numbers or the like included in the tabular objects may be sorted by an ascending order or a descending order.

Then, it is checked whether to use paging function in the tabular view (step S144).

The paging refers to setting the numbers of the rows or columns to display the tabular objects in a page.

If it is determined that the paging function is to be used (Yes in step S144), a hiding layer for paging is generated, and the objects are moved to the hiding layer (step S145). As used herein, the hiding layer hides the rest of the objects if a predetermined number of objects are displayed on a current page. The objects hidden by the hiding layer may be moved to the next page sequentially to be displayed on it.

A page index object to identify each page is inserted (step S146), and view format for the objects configuring the tabular view can be determined by setting page information, the font and form of the page index, etc.

Finally, the screen objects are arranged (step S147).

In this step, the coordinates on the screen may be configured prior to displaying the configured tabular view on the screen.

If it is determined that the paging function is not used (No in step S144), the view objects may be arranged all the way without dividing pages (step S147).

Figure 6:
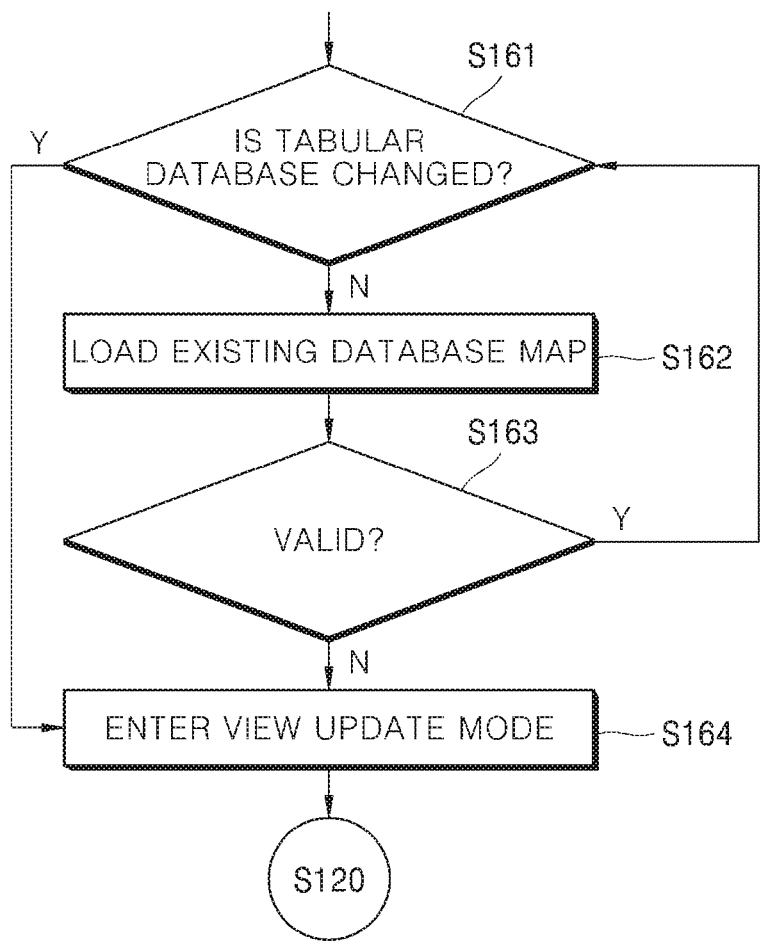
FIG. 6 is a flowchart for illustrating the step of checking a view update mode in more detail.

FIG. 6 is a flowchart for illustrating the step S160 in more detail.

According to the exemplary embodiment of the present disclosure, the controller 150 may detect whether there is a change in data in the tabular database at predetermined intervals and reflect it to update the tabular view.

Referring to FIG. 6, the controller 150 checks if there is a change in the tabular database (step S161).

In doing so, the controller 150 checks a change in the number of data of the tabular configuration objects first.

If the number of the objects provided from the actual database is increased or decreased (Yes in step S161), it immediately enters a view update mode (step S164).

A change in the number of the tabular object data means that the entire view format has to be changed. Accordingly, the controller 150 may control the tabular view generating apparatus 100 so that it immediately enters the view update mode. Entering the view update mode means that a series of processes from step S120 shown in FIG. 4 are repeated. In addition, it is to be noted that it may also be checked if there is a change in the form of the graphically-presented object data, as well as the number of the data. As such, according to the exemplary embodiment of the present disclosure, it is determined whether the properties of data are matched in order to detect a change in the object configuration.

For example, the graphic objects may include two object data properties, i.e., a layer property and a form property. Even if the form property of the object data is changed, there may be two changed object data. In this case, it may also be checked if there is a change in the form of the graphically-presented object data, as well as the number of the data. If it is checked that the form of the object data has been changed, the controller 150 controls the tabular view generating apparatus 100 so that it enters the view update mode.

That is, since the graphic editor knows the change in the actual database, a series of processes are carried out by initializing the monitoring view, receiving data from the graphic editor and using the newly changed data. By doing so, the view can be updated automatically based on the periodically checked result even if the operator is not aware of it.

Preferably, the phrase that the screen is updated automatically means that the processes are carried out in the system by itself independently of the operator's manual operation, rather than that the processes are carried out automatically in real-time as soon as data in the database is changed.

If it is determined that there is no change in the number of object data in the tabular database (No in step S161), an existing database map is loaded (step S162).

The existing database map refers to information displayed on the current tabular view that is stored as a file. Accordingly, in order to be compared with the tabular database when it is checked, the existing database map may store the updated content so that the displayed view can be compared with the stored, existing database map.

Accordingly, the existing database map is compared with the tabular database when it is checked, such that it is checked if the data is valid (step S163).

The validity check is performed to determine if the association between the data is valid even if no change is checked in the number of the data. In other words, it is to check if an object is displayed as belonging to another layer than its layer, or if wrong mapping information is displayed, even though there was no change in the number of the data.

The mapping error on the association can be easily detected by comparing the existing database map with the data in the database when it is checked.

Accordingly, if it is determined that the existing database map is not matched to the database when it is checked (No in step S163), it is necessary to update the view and thus it enters the view update mode (step S164).

If it is determined that the existing database map is matched to the information on the database when it is checked (Yes in step S163), it is checked again if there is a change in the tabular database at predetermined intervals (step S161).

In addition, the predetermined intervals may be determined taking into account the operator's intention and the operation efficiency of the system. For example, the intervals may be set to be shorter unless the system load is affected. Moreover, the intervals may be set to be very short to approximate real-time. On the other hand, if the data in the database has an property that cannot be changed greatly, the intervals may be set to be longer. This is merely illustrative and may vary depending on the designer, the operator and the operation of the system.

In the foregoing description, the automatic update mode may be carried out when the tabular view is displayed. In some implementations, a step of determining whether to perform the automatic update mode may also be included.

As described above, according to the exemplary embodiment of the present disclosure, the tabular view automatic update function is implemented, such that a change in the database is periodically checked and the screen display may be updated by reflecting it.

In the existing tabular view, even if there is a change in the database, it is not possible to reflect it to the actual tabular view, and thus the operator cannot check the changed data. In contrast, according to the exemplary embodiment of the present disclosure, it is possible to overcome such problem and to thereby improve management efficiently of the industrial control system.

For the monitoring view in industrial control system, it is most important to match the currently displayed data with the data in the database. Accordingly, the system can check periodically and update automatically independently of whether the operator's awareness, such that the safety of the system operation can be improved.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A tabular view generating apparatus comprising:
   a database configured to store data received from a data acquisition and management system, wherein the data acquisition and management system comprises an energy management system or a remote control system;
   a user input configured to receive a tabular view control signal on the data received and stored from the data acquisition and management system;
   a tabular view generator configured to generate a tabular view with the data stored in the database according to items that are received via the user input;
   a display configured to display the tabular view created by the tabular view generator under the control of a controller; and
   the controller having a graphic editor and configured to engineer the data received from the database, wherein the tabular view generating apparatus is configured to:
  engineer, by a controller, data necessary for displaying a view,
  load, by the controller, a monitoring view to initialize the monitoring view;
  determine, by the controller, whether to display the monitoring view as a non-tabular view or a tabular view;
  set, by the tabular view generator, a tabular module if it is determined that the tabular view is to be displayed;
  display the tabular view in the display according to a tabular module setting; and
  check, by the controller, whether to perform a view update mode during the displaying the tabular view in the display,
wherein the checking comprises checking if there is a change in a number of tabular object data items in a tabular database,
wherein the controller is configured to:
  enter the view update mode if it is determined that there is a change in the number of tabular object data items in the tabular database;
  control the view update mode according to the change in the number of tabular object data items; and
  change the display of the tabular view according to the change in the number of tabular object data items in the tabular database,
wherein the change of the display of the tabular view is carried out automatically,
wherein the controller is further configured to:
  check validity by comparing an existing database map with the tabular database at the time of the checking in response to a determination that there is no change in the number of the tabular object data items, wherein the existing database map comprises data displayed on a current tabular view; and
  in response to a determination that it is not valid, enter the view update mode and load the monitoring view to initialize the monitoring view,
wherein the checking the validity comprises determining, by the controller, whether properties or associations of the tabular object data items are matched, and the properties of the object data items contain information on a form and a size of data objects.

2. The tabular view generating apparatus of claim 1, wherein if the controller determines that there is a change in the number of the tabular object data items, the controller enters the view update mode via a multi-thread task, and loads the monitoring view to initialize the monitoring view.

3. The tabular view generating apparatus of claim 1, wherein if the controller determines that the data items are matched, the controller checks again if there is a change in the number of tabular object data.

4. The tabular view generating apparatus of claim 1, wherein the checking whether to perform the view update mode further comprises checking whether to perform the view update mode periodically at a predetermined interval.

* * * * *